(No Model.)
H. E. FORREST.
TUNING PIN FOR MUSICAL INSTRUMENTS.
No. 322,272. Patented July 14, 1885.
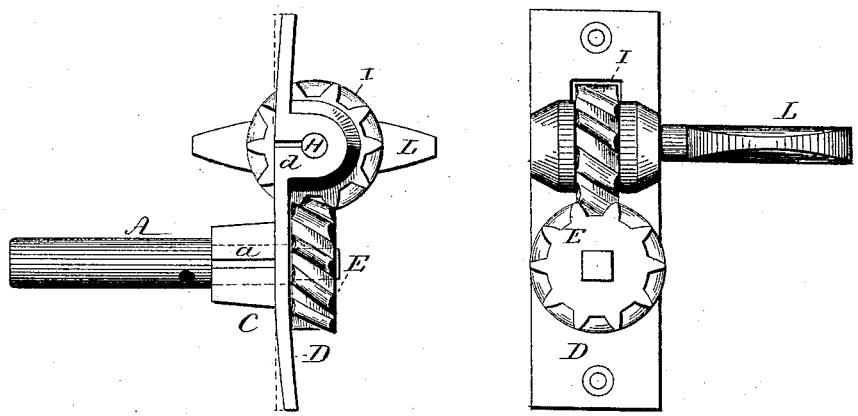
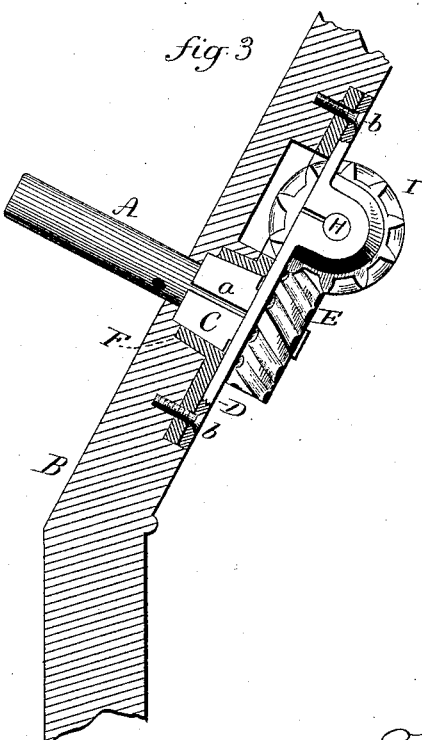
Witnesses:
Hamlet E. Forrest,
Inventor
By atty.

UNITED STATES PATENT OFFICE.

HAMLET E. FORREST, OF NEW HAVEN CONN., ASSIGNOR OF TWO-THIRDS TO WILLIAM H. BEECHER AND EDWD. G. MANSFIELD, OF SAME PLACE.

TUNING-PIN FOR MUSICAL INSTRUMENTS.

SPECIFICATION forming part of Letters Patent No. 322,272, dated July 14, 1885.

Application filed October 23, 1882. Renewed January 6, 1885. (No model.)

*To all whom it may concern:*

Be it known that I, HAMLET E. FORREST, of New Haven, in the county of New Haven and State of Connecticut, have invented new Improvements in Tuning-Pins for Stringed Instruments; and I do hereby declare the following, when taken in connection with accompanying drawings, and the letters of reference marked thereon, to be a full, clear, and exact description of the same, and which said drawings constitute part of this specification, and represent, in—

Figure 1, a side view of the pin detached; Fig. 2, an under side view of the same; Fig. 3, a sectional side view.

This invention relates to an improvement in tuning-pins for banjos, guitars, and other stringed instruments.

The friction-pin most commonly employed would be most desirable for such instruments were it not that before the pin can be turned to strain or let down the string it is necessary to give it a slight axial movement in order to relieve it from the friction required to hold the pin in place, and then press the pin inward after the required tension is attained. To avoid this difficulty, a toothed pinion has been arranged upon the pin and so as to revolve with it, and a worm arranged to work in a pinion; but this is necessarily very slow in its operation, and frequently requires many turns of the worm to accomplish the object.

The object of my invention is to retain the common arrangement of pin—that is to say, a pin which will be rotated to substantially the same extent as the device by which it is turned—so that the movement of the pin will be substantially as quick as the common friction-pin, and to hold the pin by friction in such a manner as to avoid the necessity of an axial movement of the pin to relieve the friction; and in the construction as hereinafter described, and more particularly recited in the claims, my invention consists.

A represents the tuning-pin, which is preferably a metal spindle extending through the head B of the instrument, and standing in the usual relation of the pin to the strings. This pin stands in a bearing, C, attached to a plate, D, applied to the reverse side of the head, and on the end of the pin outside the plate a pinion, E, is firmly fixed. The bearing C, which projects from the plate, is split, as at $a$, and the opposite sides of the socket are inclined inward, as seen in Fig. 3, so as to be wedge-shaped. On the side of the head, beneath the plate, a metal socket, F, is arranged, corresponding to the inclined sides of the bearing C, and so that as the bearing is forced into the socket it will contract the bearing upon the pin, so as to produce friction between the two. The plate D is secured to the head by screws $b$, which draw it toward the socket F, and so that the pressure of the parts of the bearing upon the pin may be increased by drawing the plate D closer upon the socket, the socket F being fitted firmly in the head, to thus receive the bearing C. On the plate D a transverse shaft, H, is arranged, carrying a pinion, I, corresponding to the pinion D. The axis of one being at right angles to the other, the teeth are inclined at an angle of forty-five degrees, so that one pinion, I, works into the other pinion, D, so that the revolution of one may cause a corresponding revolution of the other. The shaft H extends outward, and is fitted with a head, L, by which it may be turned. The bearing for the shaft H is also split, as seen at $d$, Fig. 2, upon the under side of the shaft, and that end of the plate turned outward, and so that the plate taking a bearing on the head between the tuning-pin and the split in the bearing, the bent end of the plate may be forced toward the head, as indicated in broken lines Fig. 1, partially closing the split in the bearing, so as to bring a frictional pressure upon the shaft.

As the tuning-pin is applied to the head, the screws $b$ $b$, are turned inward until, because of the contraction of the bearings, as before described, a friction is produced sufficient to resist the strain of the strings. This pressure will be constant, and to tune the string it is only necessary to overcome the friction upon the bearings, and this is done by applying power to the head L in the usual manner of turning tuning-pins, and because the two pinions are substantially alike the movement of the pin is equal to the movement of the head, and hence is equally as rapid in its movement as the tuning-pin, which is formed as a part of the head which turns it.

The friction is constant and does not require to be relieved in order to be so turned, as in the most common construction of tuning-pins.

Either of the split bearings may have sufficient frictional force without the other. I do not therefore wish to be understood as limiting my invention to the frictional bearing both for the pin and for the shaft, it only being essential to my invention that there shall be a clamping device in connection with the bearing through which the pin is turned which will apply sufficient friction to the pin to resist the strain of the string.

While I prefer the inclined or spiral pinions which I have shown, other equivalent gearing may be employed; or in some cases the turning-head L may be applied directly to the tuning-pin, there being sufficient friction in the single bearing to hold the pin.

I claim.

1. The combination of a tuning-pin for stringed instruments with a split bearing, and mechanism, substantially such as described, for clamping the parts of the bearing upon the pin to produce the required friction to hold the pin, substantially as described.

2. The combination of a tuning-pin for stringed instruments with a split bearing for the pin, a transverse shaft and gearing between said transverse shaft and pin, whereby the turning of the transverse shaft correspondingly turns the pin, the said transverse shaft arranged in a split bearing, and mechanism, substantially such as described, to clamp the bearing upon the shaft and upon the pin, substantially as described.

3. The combination of the pin A, arranged in wedge-shaped split bearing C, attached to the plate D, and the socket F to receive said wedge-shaped bearing, and means for adjusting the bearings, substantially as described.

4. The combination of the tuning-pin A, arranged through the head in plate D, pinion E, fixed to said pin, transverse shaft H, arranged in a bearing in said plate split from the shaft through the plate toward the head and carrying a corresponding pinion, I, the said plate secured to the head of the instrument, and whereby friction is applied to the transverse shaft, substantially as described.

HAMLET E. FORREST.

Witnesses:
Jos. C. Earle,
J. H. Shumway.